United States Patent
Scholzen et al.

(10) Patent No.: US 9,016,115 B2
(45) Date of Patent: Apr. 28, 2015

(54) DEVICE FOR SENSING A PRESSURE, PARTICULARLY A PRESSURE IN A COMBUSTION CHAMBER OF AN INTERNAL COMBUSTION ENGINE

(75) Inventors: Holger Scholzen, Stuttgart (DE); Martin Gorzolka, Erdmannhausen (DE); Janpeter Wolff, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/113,870

(22) PCT Filed: Mar. 8, 2012

(86) PCT No.: PCT/EP2012/054004
§ 371 (c)(1), (2), (4) Date: Dec. 30, 2013

(87) PCT Pub. No.: WO2012/146429
PCT Pub. Date: Nov. 1, 2012

(65) Prior Publication Data
US 2014/0102185 A1    Apr. 17, 2014

(30) Foreign Application Priority Data
Apr. 28, 2011 (DE) .......................... 10 2011 017 647

(51) Int. Cl.
G01M 15/08 (2006.01)
G01L 9/00 (2006.01)
G01L 19/04 (2006.01)
G01L 23/10 (2006.01)

(52) U.S. Cl.
CPC ............... *G01M 15/08* (2013.01); *G01L 9/008* (2013.01); *G01L 19/04* (2013.01); *G01L 23/10* (2013.01)

(58) Field of Classification Search
USPC ....................................... 73/114.18
See application file for complete search history.

(56) References Cited

U.S. PATENT DOCUMENTS

| | | | | |
|---|---|---|---|---|
| 5,142,914 A * | 9/1992 | Kusakabe et al. | ............... | 73/723 |
| 5,168,192 A * | 12/1992 | Kosugi et al. | ............... | 310/338 |
| 5,199,303 A * | 4/1993 | Benedikt et al. | ............... | 73/727 |
| 5,249,468 A * | 10/1993 | Benedikt et al. | ............... | 73/706 |
| RE34,441 E * | 11/1993 | Ruckenbauer et al. | ......... | 73/756 |
| 5,353,633 A * | 10/1994 | Benedikt et al. | ........... | 73/114.18 |
| 5,488,868 A * | 2/1996 | Ootake et al. | ............... | 73/708 |
| 5,503,023 A * | 4/1996 | Benedikt et al. | ............... | 73/726 |
| 5,606,117 A * | 2/1997 | Vogel et al. | ............... | 73/114.18 |
| 5,703,282 A * | 12/1997 | Kuesell et al. | ............ | 73/114.18 |
| 6,487,898 B1 * | 12/2002 | Haefner et al. | ............ | 73/114.18 |
| 6,923,068 B2 * | 8/2005 | Barron | ............... | 73/719 |
| 6,962,085 B2 * | 11/2005 | Oda et al. | ............... | 73/727 |
| 7,171,857 B2 * | 2/2007 | Barron | ............... | 73/719 |
| 2004/0255683 A1 | 12/2004 | Barron | | |
| 2012/0234084 A1 * | 9/2012 | Ledermann et al. | ....... | 73/114.18 |

FOREIGN PATENT DOCUMENTS

| | | |
|---|---|---|
| CN | 2266737 | 11/1997 |
| CN | 1977154 | 6/2007 |
| DE | 10 2009 022539 | 12/2010 |
| DE | 10 2010 038798 | 2/2012 |
| JP | 58-60234 | 4/1983 |
| JP | 63-78238 | 5/1988 |
| JP | 4-290937 | 10/1992 |
| JP | 2009-527748 | 7/2009 |
| JP | 2010-271321 | 12/2010 |
| WO | 2007/043068 | 4/2007 |

* cited by examiner

*Primary Examiner* — Freddie Kirkland, III
(74) *Attorney, Agent, or Firm* — Kenyon & Kenyon LLP

(57) ABSTRACT

A device for sensing a pressure, particularly in a combustion chamber of an internal combustion engine. The device has a housing and an adapter element, secured in the housing, for accommodating a sensor module. The sensor module includes a transmission element, a sensor element and a supporting element, the sensor module being supported by way of the transmission element on a compensation member which is joined to the adapter element, and by way of the supporting element on a fixing element. At an end face pointing toward the sensor module, the compensation member is provided with a circular recess, in which the transmission element is accommodated in centered fashion.

10 Claims, 3 Drawing Sheets

DEVICE FOR SENSING A PRESSURE, PARTICULARLY A PRESSURE IN A COMBUSTION CHAMBER OF AN INTERNAL COMBUSTION ENGINE

FIELD OF THE INVENTION

The present invention relates to a device for sensing a pressure, particularly a pressure in a combustion chamber of an internal combustion engine.

BACKGROUND INFORMATION

Devices for sensing the pressure in a combustion chamber of an internal combustion engine are discussed, for example, in DE 10 2010 038 798. In that case, two specific embodiments are described, the one specific embodiment describing a single device for sensing the combustion-chamber pressure, in which a sensor module having a sensor element for sensing pressure is disposed in a housing, the pressure in the combustion chamber being transmitted to the sensor element via a diaphragm. The other specific embodiment relates to an integrated design approach of a sensor module having a sensor element for sensing pressure, in which the sensor module is integrated into a sheathed-element glow plug, the sensor module being coupled to a glow element of the sheathed-element glow plug. The pressure in the combustion chamber is transmitted to the sensor element via the glow element.

SUMMARY OF THE INVENTION

An object of the present invention is to configure the sensor module in such a way that the device for sensing the pressure is able to be assembled more easily and efficiently.

A centering function for the sensor module is provided by the device according to the present invention having the characterizing features set forth herein. The device is thereby able to be assembled more easily and efficiently.

The measures set forth in the further descriptions herein permit advantageous further refinements of the invention.

For manufacturing reasons, the sensor element has a cornered, which may be a quadrangular cross-section orthogonally to the axial extension of the sensor module. It is expedient for the force transmission and force distribution if, orthogonally to the axial extension of the sensor module, the transmission element has a cornered cross-section adapted essentially to the cornered cross-section of the sensor element.

One advantageous implementation of the centered mounting of the transmission element in the compensation member is achieved if the recess formed on the compensation member is circular, if the corners of the transmission element are provided with roundings, if the roundings have one common rounding circle, and if the transmission element having the roundings is inserted in the circular recess of the compensation member.

The centered joining of the sensor module and the compensation member is facilitated if the common rounding circle for the roundings has a smaller diameter than the diameter of the circular recess on the compensation member. In this manner, a clearance fit is provided for the accommodation of the transmission element in the circular recess of the compensation member.

The sensor module further includes a supporting element, with which the sensor module is supported on a fixing element. To that end, the fixing element is joined firmly to the adapter element via a sleeve-shaped connecting piece.

Force is transmitted from the pressure sensor to the sensor module via a force path, in that the compensation member is supported against a rest on the adapter element, and in that the sensor module is preloaded between the compensation member and a fixing element with the aid of a preload force.

Good manageability of the sensor module when assembling the device is possible if the sensor module, having the transmission element, the sensor element and the supporting element, is fixed in position and centered with the aid of a heat-shrinkable sleeve.

An exemplary embodiment of the present invention is shown in the drawing and elucidated in greater detail in the following description.

DETAILED DESCRIPTION

Figure 1:
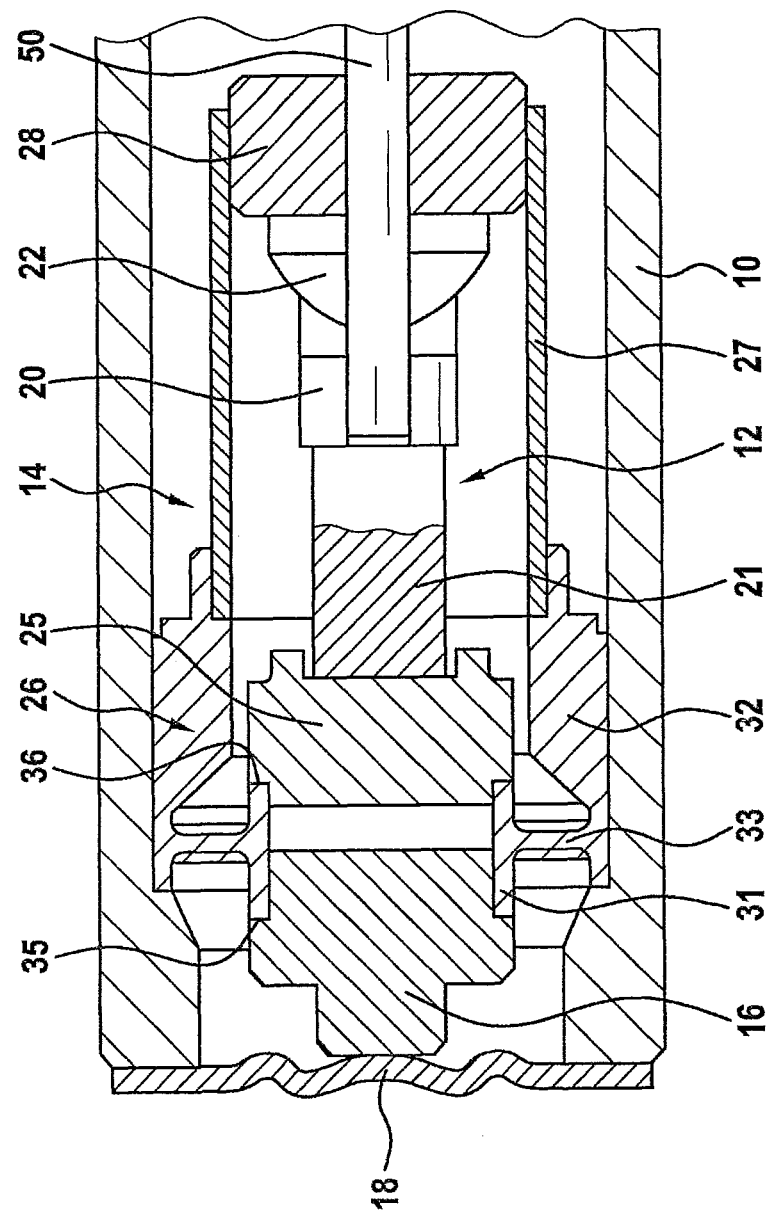
FIG. 1 shows a sectional view through a device for sensing the pressure in a combustion chamber of an internal combustion engine.

The device for sensing the pressure in a combustion chamber of an internal combustion engine has at least a housing 10, in which a sensor module 12 is disposed that is acted upon by the pressure of the combustion chamber via a force path 14.

Sensor module 12 includes a sensor element 20, to which a transmission element 21 is attached on the combustion-chamber side, and a supporting element 22 is attached on the opposite side. For manufacturing reasons, sensor element 20, in the form of a piezoelectric sensor, has a cornered cross-section, which may be a square cross-section orthogonally to the axial extension of sensor module 12. Sensor element 20 has contact surfaces which are contacted with electrical connecting leads implemented, for example, as flat conductor bars 50. Conductor bars 50 run in the axial direction to contact points, not shown.

Force path 14 includes a pressure sensor 16, a compensation member 25 for temperature compensation, an adapter element 26, a sleeve-shaped connecting piece 27 and a fixing element 28. Compensation member 25 may be axially symmetrical.

Adapter element 26 is implemented with a first section part 31, a second section part 32 and an essentially radially running, flexible crosspiece 33 in between. Adapter element 26 is joined firmly to housing 10 by way of second section part 32. Adapter element 26 is joined to housing 10 by joining second section part 32 firmly to the inner wall of housing 10, for example, by welding. Moreover, on the combustion-chamber side, adapter element 26 is joined at first section part 31 to pressure sensor 16, and at the opposite side, to compensation member 25. To that end, first section part 31 is implemented with a seat 35 on which pressure sensor 16 is mounted. At the opposite side, first section part 31 has a rest 36 on which compensation member 25 is supported. The axial distance between compensation member 25 and fixing element 28 is bridged by sleeve-shaped connecting piece 27, which is joined on one side to adapter element 26, and on the other side to fixing element 28, for example, by welding.

Apart from force path 14 described above, via which forces, movements or pressures are transmitted directly by pressure sensor 16 to sensor element 20, paths through the housing must also be taken into account. Since different materials which may have different thermal expansions may be included in the transmission paths, in response to the high temperature fluctuations to which the device may be exposed, thermomechanical stresses may occur because of these different expansions. These thermomechanical stresses may lead to falsification of measuring results or even to damage to the device. In order to avoid this, compensation member 25 is connected upstream of sensor module 12 on force path 14. For example, compensation member 25 may be adapted by a suitable choice of its length and/or its coefficient of thermal expansion, so that at least within typical temperature ranges to which the device may be exposed, the thermal expansions of the different transmission paths are at least largely identical.

In the case of a stand-alone device for sensing the combustion-chamber pressure shown in FIG. 1, pressure sensor 16 is joined to a diaphragm 18 that is exposed to the combustion chamber. This device is used solely to detect the pressure in the combustion chamber of an internal combustion engine. In the case of a further specific embodiment not shown, pressure sensor 16 is formed by a glow tube of a sheathed-element glow plug, for example, which is exposed to the combustion chamber of the internal combustion engine.

Sensor module 12 is inserted between compensation member 25 and fixing element 28 with the aid of preloading. To that end, on the pressure-sensor side, transmission element 21, which is made of a ceramic material, is supported on compensation member 25. On the fixing-element side, sensor module 12 is supported on fixing element 28 with the aid of supporting element 22.

For better force transmission and force distribution, the components including transmission element 21 and supporting element 22 adjoining cornered sensor element 20, at least at the contact surfaces with sensor element 20, are implemented, perpendicular to the axial extension of sensor module 12, with a cornered cross-section that is adapted essentially to the cornered cross-section of sensor element 20. In the present exemplary embodiment, sensor element 20 is quadrangular with a square cross-section. Perpendicular to the axial extension of sensor module 12, transmission element 21 is likewise quadrangular with a square cross-section adapted to the cross-section of sensor element 20. At the side opposite to transmission element 21, supporting element 22 has a first section 51 which, perpendicular to the axial extension of sensor module 12, is quadrangular with a square cross-section likewise adapted to the cross-section of sensor element 20.

Figure 2:
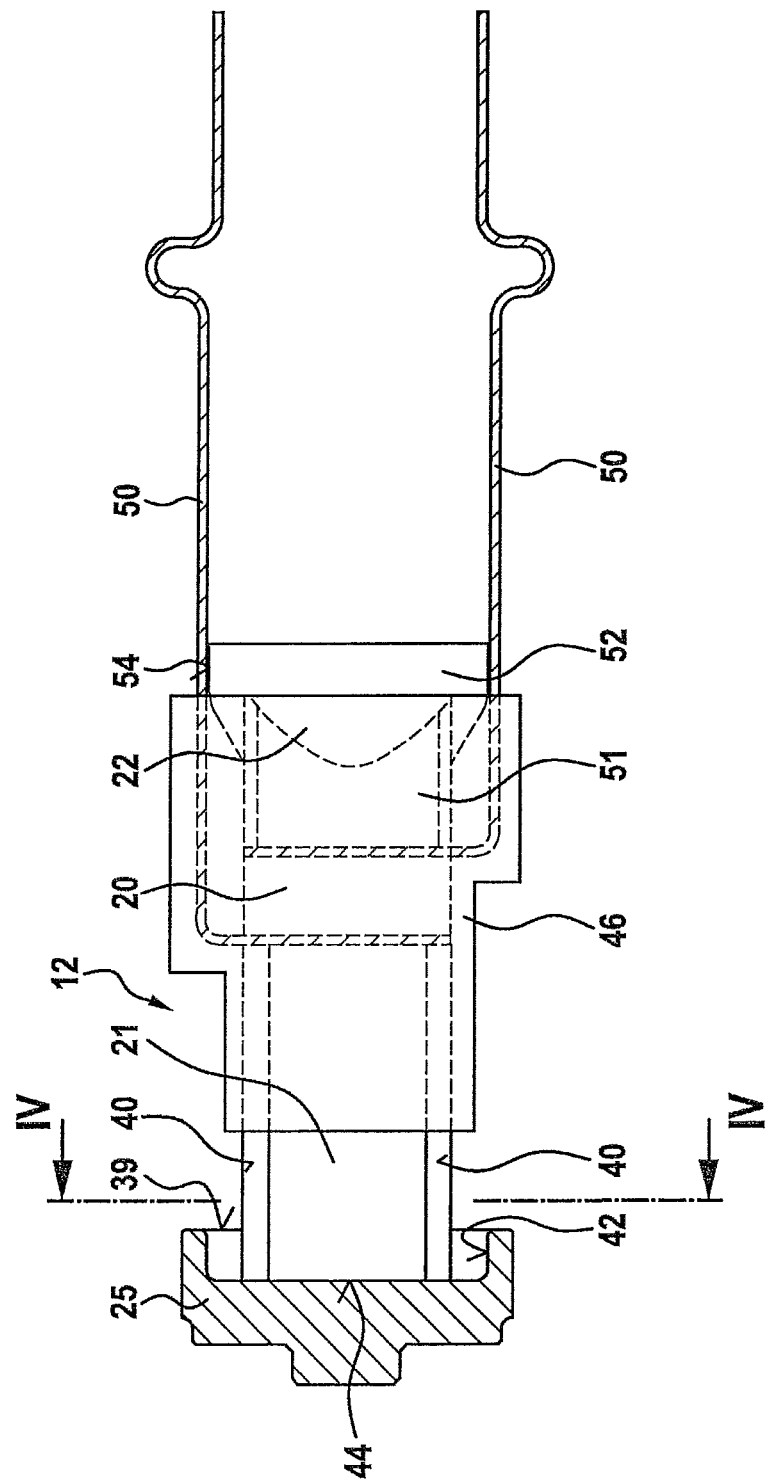
FIG. 2 shows a sectional view through a sensor module of the device according to FIG. 1.
Figure 3:
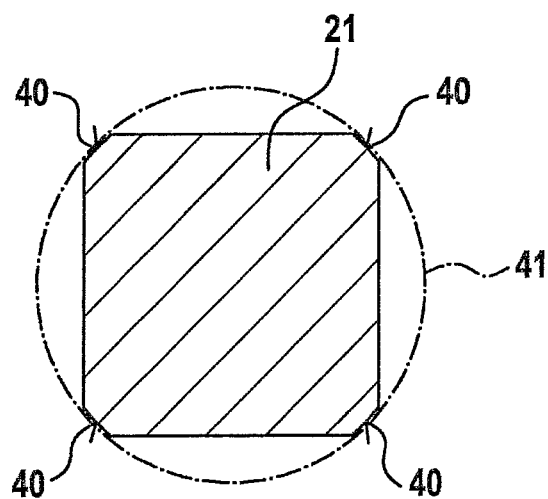
FIG. 3 shows a sectional view through a transmission element from FIG. 2.
Figure 4:
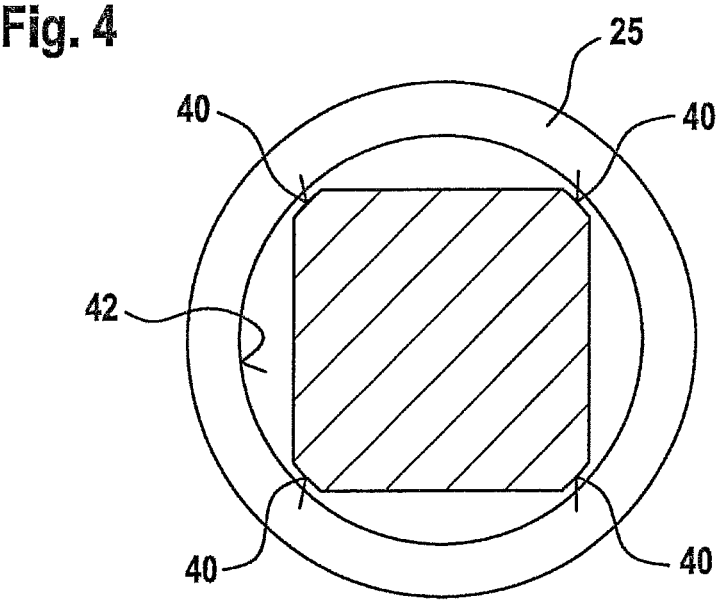
FIG. 4 shows a sectional view along the line IV-IV in FIG. 2.

According to FIG. 2, for the coaxial alignment of compensation member 25 and sensor module 12, at an end face 39 pointing toward sensor module 12, compensation member 25 is provided with a circular recess 42 in which transmission element 21 is accommodated with an end face 44. To that end, according to FIGS. 3 and 4, the four corners of transmission element 21 are provided with roundings 40 which lie on one common virtual rounding circle 41. In this context, the diameter of circular recess 42 is slightly greater than the diameter of virtual rounding circle 41 on transmission element 21. A slight play is thereby provided between rounding circle 41 and circular recess 42 which, for assembly reasons, facilitates the introduction of transmission element 21 into circular recess 42. Due to the selected form of roundings 40, it is possible to center transmission element 21 within compensation member 25. Circular recess 42 of compensation member 25 and virtual rounding circle 41 of transmission element 21 thereby lie axially on one common centerline.

In addition to first section 51 already mentioned, which orthogonally to the axial extension of sensor module 12, is adapted to the cross-section of sensor element 20, supporting element 22 has a second section 52 having a larger cross-section. For example, second section 52 is cylindrical with a circumferential surface 54. Supporting element 22 is supported on fixing element 28 by way of the circular end face of cylindrical section 52. The two conductor bars 50 abut against circumferential surface 54 of cylindrical section 52, to thus form a defined distance for the axial routing of conductor bars 50.

The assembly process is further improved, to the effect that sensor module 12 is surrounded by a heat-shrinkable sleeve 46, with which the components of sensor module 12 are fixed in position during the assembly process. After sensor module 12 has been shrink-wrapped by heat-shrinkable sleeve 46, heat-shrinkable sleeve 46 takes over the fixation and therefore the centering of transmission element 21, of sensor element 20 and of supporting element 22 within sensor module 12. In addition, conductor bars 50 are fixed in position on supporting element 22 by heat-shrinkable sleeve 46.

What is claimed is:

1. A device for sensing a pressure, in a combustion chamber of an internal combustion engine, comprising:
   a housing;
   a sensor module disposed in the housing;
   an adapter element secured in the housing; and
   a temperature compensation member joined to the adapter element;
   wherein the sensor module includes at least one transmission element and one sensor element, and the sensor module being supported by the transmission element on the temperature compensation member joined to the adapter element, and
   wherein the compensation member, on an end face pointing toward the sensor module, includes a recess in which the transmission element is accommodated in a centered fashion.

2. The device of claim 1, wherein perpendicular to the axial extension of the sensor module, the transmission element has a cornered cross-section, and the corners of the transmission element include roundings.

3. The device of claim 2, wherein the cornered cross-section of the transmission element is adapted essentially to a cornered cross-section of the sensor element.

4. The device of claim 1, wherein the recess in the compensation member is circular, wherein the roundings have one common rounding circle, and wherein the transmission element including the roundings is inserted in the circular recess in the compensation member.

5. The device of claim 4, wherein the common rounding circle for the roundings has a smaller diameter than the diameter of the circular recess on the compensation member.

6. The device of claim 1, wherein the compensation member is supported on a rest on the adapter element.

7. The device of claim 1, wherein the sensor module includes a supporting element, with which the sensor module is supported on a fixing element.

8. The device of claim 7, wherein the fixing element is joined firmly to the adapter element by a sleeve-shaped connecting piece.

9. The device of claim 7, wherein the sensor module is preloaded between the compensation member and the fixing element by a preload force.

10. The device of claim 1, wherein the sensor module, having the transmission element, the sensor element and the supporting element, is fixed in position and centered by a heat-shrinkable sleeve.

* * * * *